C. GITZENDANNER.
STRUT ROD.
APPLICATION FILED MAY 4, 1920.

1,360,925.

Patented Nov. 30, 1920.
2 SHEETS—SHEET 1.

Witnesses:

Inventor
Charles Gitzendanner
By his Attorney

C. GITZENDANNER.
STRUT ROD.
APPLICATION FILED MAY 4, 1920.
1,360,925.
Patented Nov. 30, 1920.
2 SHEETS—SHEET 2.
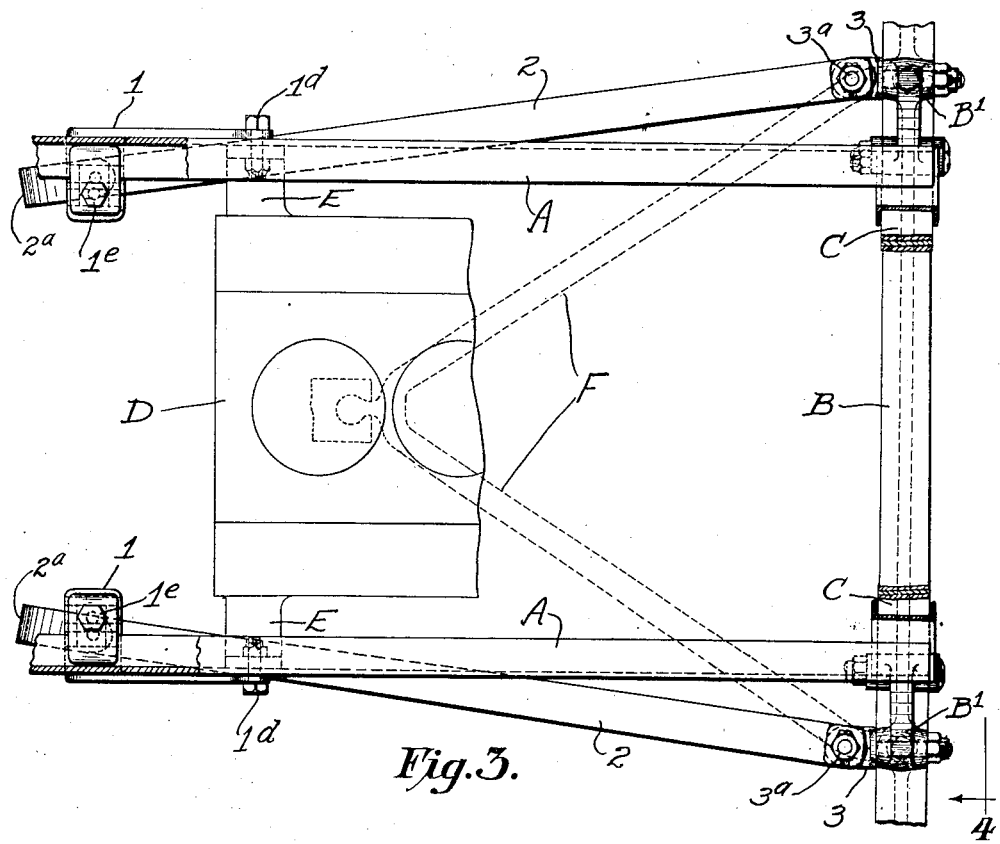
Fig. 3.
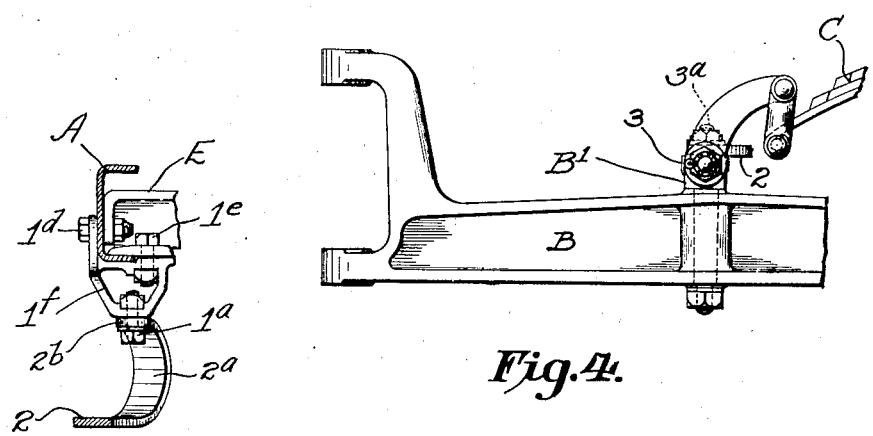
Fig. 5.
Fig. 4.
Witnesses:
Inventor
Charles Gitzendanner
By his Attorney

UNITED STATES PATENT OFFICE.

CHARLES GITZENDANNER, OF BROOKLYN, NEW YORK.

STRUT-ROD.

1,360,925.  Specification of Letters Patent.  Patented Nov. 30, 1920.

Application filed May 4, 1920. Serial No. 378,806.

*To all whom it may concern:*

Be it known that I, CHARLES GITZENDANNER, a citizen of the United States, residing in the town of Ridgewood, borough of Brooklyn, county of Queens, State of New York, have invented certain new and useful Improvements in Strut-Rods, of which the following is a specification, reference being had to the accompanying drawings, illustrative of one particular embodiment of my invention.

This invention relates to the part of a vehicle which serves the purpose of maintaining the predetermined horizontal position of axle with respect to the frame or body usually referred to as the strut rod. Such member serves to connect and carry the strain due to relative motion of axle and body or frame, and still permit relative vertical movement of the axle with relation to the frame or vice versa. On account of this relative movement, involving a limited motion of the axle point of attachment of the member with relation to the point at which the member is attached to the frame, it is sometimes called a radius rod or radius bar. Such strut or radius rods or bars have heretofore been attached at their ends in a manner permitting the limited but necessary oscillation or swinging by means of loose joints at one or both ends, as, for example, ball and socket joints or a double plain joint, and in some structures the joint attachment has involved a limited spring compression feature, but otherwise the strut bars are substantially horizontal and rigid throughout their length, in order to permit the compression strain involved in their function.

By the practice of my invention the loose or yielding joints at the points of attachment of the radius bar may be entirely eliminated, thereby eliminating the necessity of lubrication of any joints, and also eleminating the factor of a moving part or parts liable to wear and liable to loosening and detachment or breakage. The rigid rods heretofore used being subjected to constant whipping action with a transverse strain of continuing vibration subject to occasional excess, are liable at all times to encounter a condition of service involving a strain beyond the limits of permissible size and weight of the rigid rod made to stand the normal or average strains.

Besides a fixed attachment giving rigidity to the connection of my radius bar or strut bar, with the axle at one end and the frame or body at the other end, the inherent nature of the main portion of the bar is peculiarly adapted to withstand all vertical strains, there being a surplus yield in a curved portion of the bar to accommodate excess transverse strains or whipping action, and at the same time the form of bar admirably accommodates any transverse horizontal stress.

In general, this is accomplished by the forming of a substantially straight spring bar of relatively small depth compared with breadth and curving at one end with a suitable curvature well within the limits of conditions that would concentrate strains for crystalization of the metal or service tension fracture of the metal, and leaving both ends of the bar in such condition as to afford a clamping attachment which eliminates the chance of concentrated strains which would cause fracture at the connections if not properly arranged.

By repeated tests and long trials, the arrangement and dimensions and character of the metal have been proven to most admirably meet all the exacting requirements of this member of vehicle construction, particularly in the case of automobiles and the excessive strains involved in their operation.

One embodiment of my invention I have shown in the accompanaying drawings, in which:

Fig. 3 is a plan view of Fig. 2.

Fig. 4 is a front elevation, in part, of Fig. 2.

Fig. 5 is a front view of the adapting bracket as seen from section 5—5, Fig. 2.

Figure 1:
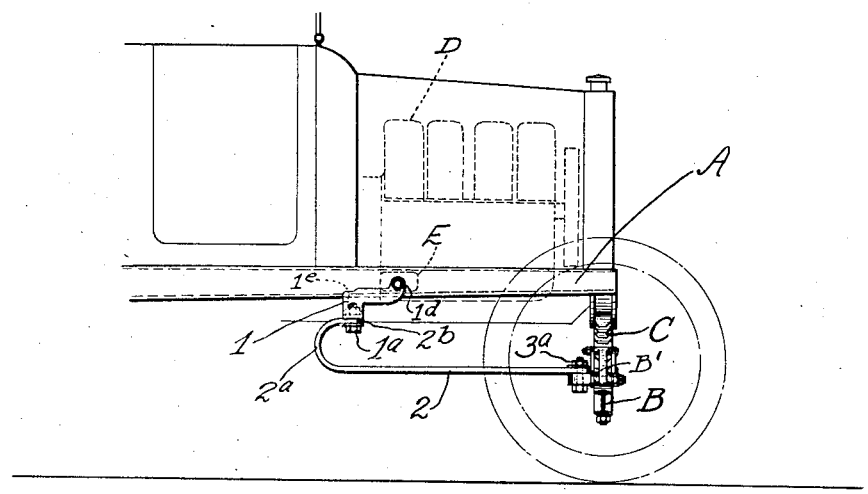
Figure 1 is an elevation showing my invention on an automobile, shown in part.
Figure 2:
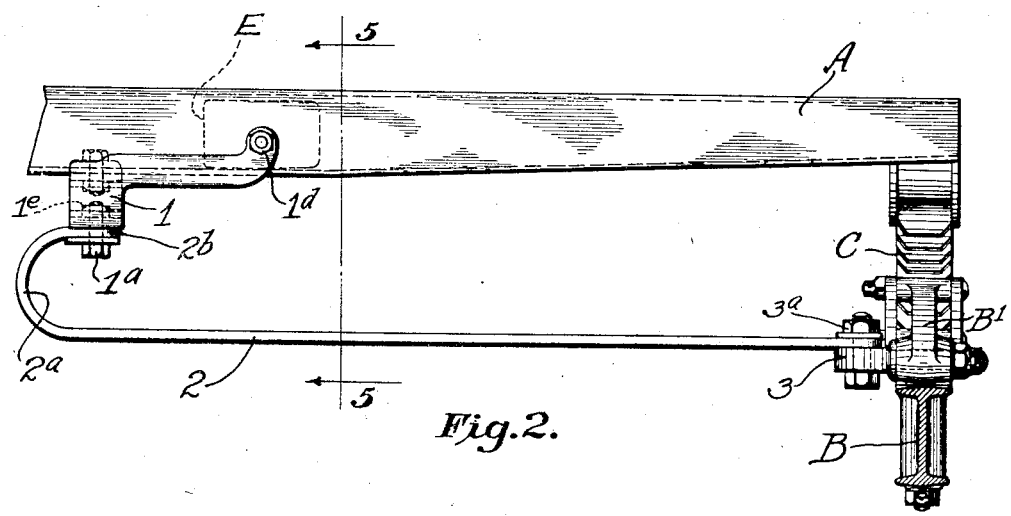
Fig. 2 is an enlarged side elevation of my radius rod, with connected parts of automobile shown fragmentary.

In the automobile, A is a sill side frame member, B is a front axle, C is the weight-supporting spring, D is the engine, E is tne engine casing supporting bracket.

The structural parts embodied in my invention comprise, a bracket 1, a spring 2 and an axle attachment lug 3. My structure serves to eliminate the necessity of using the form of radius rod F, shown in dotted lines in Fig. 3, which is the usual form ordinarily used on a Ford car, and the use of my invention is very readily adapted to displace or supplant such rigid radius rods F, and may be substituted without drilling a hole or cutting a piece, or any other alteration of the existing structure. This is accomplished by inserting the shank of the attaching plate 3 into the hole in the axle lug B'. To this attachment plate 3 the radius bar or strut bar 2 is secured by bolt $3^a$, screwed tight and with suitable washer and locked against any displacement or give.

The radius bar 2 extends from the forward end substantially straight past the bottom of the frame attaching bracket, and is then curved upward a substantial radius giving the bend $2^a$, with the return leg of the bar $2^b$ in horizontal position, located to register with the lower part of the bracket 1 to which it is bolted by bolt $1^a$, rigidly securing it against any yield or oscillation, with the bottom of the bracket.

In turn the adapting bracket 1 comprises the main plate or seat $1^b$, having on the outside a vertical flange $1^c$ with a bolt $1^d$ in common with the attachment to the frame of the engine casing bracket or leg E. A bolt $1^e$ draws a clamp to the seat confining the lower leg of the channel or side frame member A, thereby firmly securing the adapting bracket 1 to the underside of the frame member, without in any way weakening the side frame member. The bolts $1^a$ and $1^e$ have the heads on the outside available for manipulation, with nuts preferably square on the inside of the bracket-body $1^f$, with steps or recesses formed on the lower side of the seat $1^b$ and the upper side of the radius bar attaching face, so as to facilitate the locking of the nuts to more readily assure their being screwed home and permanently locked to avoid any yield or rattle.

It will thus be seen that my radius bar or strut bar provides a means of meeting the requirements of a radius rod and also meets the requirements which it heretofore has been sought to accommodate with loose joints, ball joints or loose springs,—but in my construction involve the rigid attachment of each end of the radius bar, thereby precluding the chance of all of the numerous deficiencies and troubles and the frequent breakage incident to the ordinary strut rod.

In particular, in the embodiment shown in the accompanying drawings, the weight of the forward part of the frame and body of the automobile is supported by spring C on the front axle B, in the usual manner. The ordinary strut rods F, shown dotted in the drawings, run from a bolted connection in the front axle to a ball and socket joint at the underside of the engine crank casing, and transmit therefor any horizontal shock against the front axle directly to the engine casing, and represent a very large item of the mass of the car and at all running speeds present a big factor of the total inertia of momentum, and therefore represent a very large strain on the rear end of the strut rods which must be taken up by the strut rods to resist the blow or shock delivered at the axle. That shock or constant blows confine the radius rods at different angles with respect to the frame of the automobile and the engine casing direction of momentum of mass, and therefore the ordinary radius rods and their connections are subjected to great and constant strains and twistings. Such ordinary rods have been developed in various forms with loose joints, swiveling joints and in some cases spring joints, various details requiring lubrication, but in spite thereof frequent replacement and repair. With all the breakage of strut rods known to be frequent, and in some forms of construction the percentage of breakage of rods under conditions of bad roadways is enormous.

It will thus be seen that I provide a radius bar which is rigidly secured at either end, thereby eliminating any moving joints and eliminating the necessity of lubrication. But by the inherent character and form of the radius bar, the portion intermediate the end attachments permits all the necessary vertical movement of the axle relative to the body frame, and the horizontal shock or thrust is taken up by a suitable yielding in the horizontal direction due to the curved portion or bent portion of the radius bar. This slight yield in the horizontal direction it can be shown by well known principles of mathematics, enormously reduces the shock which ultimately is transmitted to the point of attachment to the frame. Therefore, by the substitution of the vertically flexible, and horizontally slightly flexible structure of the rod itself,—all of the working conditions of a radius or strut bar are accommodated in the best form and eliminate all the troubles due to the heretofore methods of end attachment,—but more than this they accommodate more advantageously all horizontal shock. The net result is a great decrease in the shock or hammering effect upon the frame of the automobile or the crank case, or any of the essential or main elements of the mass of the moving body of the car.

On the other hand, the substitution of my construction is admirably adapted to existing types of automobiles. In the form shown, the structure embodying my invention is so made as to be connected to an existing Ford car by the simple detachment of two nuts on each side, the clamping on of my radius bars and their proper secure bolting without any adjustment or without the slightest machining, drilling or other operation on the existing automobile structure.

The great advantage of my invention is readily appreciated by the automobile engineer constantly dealing with the stresses and strains due to shock of a moving mass, as well as the constant hammering action involved in rigid connections where parts are subjected to constant vibration, both vertical and horizontal. The pneumatic tire on the wheel has been developed to the refinement of absorbing in a wonderful way the small irregularities of road, the spring suspension has been developed for most advantageous accommodation of the vertical load shocks and vibration,—but heretofore the essential link between the spring-suspended moving mass of engine, body and frame has been connected to the axle in such a manner as to involve most cruel and intense strains of a complex nature in that connecting link, namely, the strut rod.

A full analysis of my improved strut bar or radius bar, it will be seen brings the accommodation of such excessive strains in that particular link in automobile structure, to a point of refinement similar in perfection to the heretofore perfected characteristics of weight-suspension and tire duty.

The main member of my radius bar structure must of necessity be of a suitable quality of material, preferably very homogenous and perfect spring steel, fashioned without injury to the required qualities for its duty, and with the avoidance of any tempering defects, or any defects which will weaken it at the points of attachment to the frame or frame bracket and to the axle or axle lug adapter.

While various modifications may be made in material, arrangement and form of construction, its adaption to different sizes and types of cars or trucks or vehicles, will of necessity be varied to suit the particular conditions in each,—therefore without confining myself to the precise embodiment herein shown and described, what I claim and desire to secure by Letters Patent is:

1. A strut rod comprising a flat spring metal member, a curved section near one end thereof at a substantially uniform radius terminating in a reverse flat end and a terminal flat section at the opposite end, a bracket with a seat adapted to engage either end of said bar and means for rigid attachment of each end, respectively, in its bracket.

2. In an automobile, a main frame, an axle, a weight spring connecting the same, a radius bar comprising a spring metal plate of greater horizontal width than vertical thickness adapted to receive and transmit horizontal strains between the frame and axle, a bracket rigidly adapted to the frame, a seat on said bracket and means for rigid attachment at one end of said bar, a uniformly curved section of the bar adjacent to one end extending substantially 180 degrees and merging into a straight section and a rigid means of attachment to the axle at the opposite end of the straight section.

3. In an automobile, a main frame member, an axle, a spring supporting the weight of the main frame upon the axle, a spring bar extending substantially horizontal from the axle with rigid attaching means thereto, and having a curved portion and a return section terminating in a rigid attachment to a bracket and means of rigid attachment of said bracket to the frame.

4. A radius bar for automobiles or like vehicles, comprising a flat spring bar or leaf substantially straight throughout its length, with a return curved section at one end and means for rigid attachment at either end, respectively, to the relatively moving parts of a vehicle.

5. In an automobile, a main frame member, an axle, a weight-supporting spring connecting the two, a radius bar comprising a flat spring member substantially horizontal, means of rigid attachment of same to the axle, a means of rigid attachment to the frame, a substantially straight section from the axle attachment reaching to or beyond the point of frame attachment and merging into an integral gradually curved portion between the straight section and the means of attachement to the frame, whereby said curved portion is adapted to offer spring resistance and limited yield to horizontal strains.

In testimony whereof, I have signed my name to this application, in the presence of two subscribing witnesses, this 28th day of April 1920.

CHARLES GITZENDANNER.

Witnesses:
 HERMANN F. CUNTZ,
 H. MUCHMORE.